(12) United States Patent
Chae et al.

(10) Patent No.: US 7,135,360 B2
(45) Date of Patent: Nov. 14, 2006

(54) LIQUID CRYSTAL DISPLAY DEVICE AND METHOD OF FABRICATING THE SAME

(75) Inventors: Gee-Sung Chae, Incheon (KR); Gyoo-Chul Jo, Gyeongg-Do (KR); Yong-Sup Hwang, Gyeongg-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 105 days.

(21) Appl. No.: 10/631,725

(22) Filed: Aug. 1, 2003

(65) Prior Publication Data
US 2004/0119902 A1    Jun. 24, 2004

(30) Foreign Application Priority Data
Dec. 18, 2002  (KR) ............... 10-2002-0081459

(51) Int. Cl.
*H01L 21/00* (2006.01)
*H01L 21/8232* (2006.01)

(52) U.S. Cl. ............... 438/149; 438/154; 438/705; 438/735; 438/737

(58) Field of Classification Search ........... 349/110, 349/111, 42, 43; 438/69–70, 149–155, 158–160, 438/689, 704–707, 719–725, 735–738, 745, 438/753–757
See application file for complete search history.

(56) References Cited

U.S. PATENT DOCUMENTS

| 6,806,934 B1 * | 10/2004 | Furuhashi et al. .......... 349/139 |
| 2001/0007488 A1 * | 7/2001 | Sawada ................. 349/106 |
| 2004/0115950 A1 * | 6/2004 | Chae et al. .............. 438/745 |

FOREIGN PATENT DOCUMENTS
EP    1063693   * 12/2000

* cited by examiner

*Primary Examiner*—Thanhha S. Pham
(74) *Attorney, Agent, or Firm*—Morgan, Lewis & Bockius LLP

(57) ABSTRACT

A liquid crystal display device includes a plurality of gate lines and data lines on a first substrate defining a plurality of pixel regions, a thin film transistor within the pixel regions, a pixel electrode within the pixel regions, and at least one TiOx layer provided with the thin film transistor.

9 Claims, 17 Drawing Sheets

LIQUID CRYSTAL DISPLAY DEVICE AND METHOD OF FABRICATING THE SAME

The present invention claims the benefit of Korean Patent Application No. 81459/2002 filed in Korea on Dec. 18, 2002, which is hereby incorporated by reference.

BACKGROUND OF THE INVENTION

1. Field of the Invention

The present invention relates to a display device and a method of fabricating a display device, and particularly, to a liquid crystal display device and a method of fabricating a liquid crystal display device.

2. Description of the Related Art

In general, flat panel displays, such as liquid crystal display (LCD) devices, commonly include an active device, such as a thin film transistor, provided at pixel regions to drive the display device. In addition, a driving method for the LCD device is commonly referred to as an active matrix driving type method, wherein the active device is disposed at respective pixel regions that are arranged in a matrix configuration to drive corresponding pixels.

FIG. 1 is a plan view of an LCD device according to the related art. In FIG. 1, a TFT LCD uses a thin film transistor (TFT) 10 as an active device. In addition, an N×M matrix configuration of pixels are arranged along longitudinal and transverse directions, and includes the TFT 10 formed at a crossing region of a gate line 3, which receives a scan signal supplied from a driving circuit of an exterior portion of the LCD device, and a data line 5, which receives an image signal. The TFT comprises a gate electrode 11 connected to the gate line 3, a semiconductor layer 12 formed on the gate electrode 11, which is activated when the scan signal is supplied to the gate electrode 11, and a source electrode 13 and a drain electrode 14 formed on the semiconductor layer 12. A pixel electrode 16, which is connected to the source and drain electrodes 13 and 14 to operate a liquid crystal material (not shown) by supplying the image signal through the source and drain electrodes 13 and 14 as the semiconductor layer 12 is activated, is formed on a display area of the pixel.

FIG. 2 is a cross sectional view along I–I' of FIG. 1 according to the related art. In FIG. 2, the TFT 10 is formed on a first substrate 20 made of a transparent material, such as glass, and includes the gate electrode 11 formed on the first substrate 20, a gate insulating layer 22 deposited on an entire surface of the first substrate 20 upon which the gate electrode is formed 11, a semiconductor layer 12 formed on the gate insulating layer 22, source and drain electrodes 13 and 14 formed on the semiconductor layer 12, and a passivation layer 24 deposited on an entire surface of the first substrate 20. A pixel electrode 16, which is connected to the drain electrode 14 of the TFT 10 through a contact hole 26 formed on the passivation layer 24, is formed on the passivation layer 24.

In addition, a black matrix 32, which is formed on a non-display area (i.e., a TFT 10 forming area) and an area between pixels to prevent light from transmitting to the non-display area, and a color filter layer 34 for producing R(Red), G(Green), and B(Blue) colors are formed on a second substrate 30 made of transparent material, such as glass. The first and second substrates 20 and 30 are bonded together, and a liquid crystal material layer 40 is formed therebetween.

FIGS. 3A to 3I are cross sectional views of a fabrication method of an LCD device according to the related art. In FIG. 3A, a metal layer 11a is formed by depositing metal material on the first substrate 20, and a photoresist layer 60a is formed on the metal layer 11a and baked at a certain temperature. Then, light is radiated onto the photoresist layer 60a through a mask 70.

In FIG. 3B, a developer is applied to the photoresist layer 60a, and a photoresist pattern 60 is formed on the metal layer 11a. For example, when the photoresist is a negative photoresist, portions of the photoresist layer 60a that are not exposed to the light are removed by the developer.

In FIG. 3C, an etching solution is applied to the metal layer 11a. Accordingly, a portion of the metal layer 11a blocked by the photoresist pattern 60 remains, whereby a gate electrode 11 is formed on the first substrate 20.

In FIG. 3D, a gate insulating layer 22 is formed on an entire surface of the first substrate 20, and a semiconductor layer 12a is formed on the gate insulating layer 22. Then, a photoresist layer is deposited onto the semiconductor layer 12a, and a mask (not shown) is provided such that light is radiated onto the photoresist layer and developed to form a photoresist pattern 62 on the semiconductor layer 12a. Next, an etching solution is applied to the semiconductor layer 12a such that only a portion of the semiconductor layer 12a under the photoresist pattern 62 remains on the gate insulating layer 22.

In FIG. 3E, the photoresist pattern 62 (in FIG. 3D) is removed. Accordingly, a semiconductor layer 12 is formed on the gate electrode 11.

In FIG. 3F, a metal material is deposited on an entire surface of the first substrate 20, and a photoresist pattern (not shown) is formed using a mask (not shown). Then, the metal material is etched using the photoresist pattern (not shown) for forming a source electrode 13 and a drain electrode 14 on the semiconductor layer 12.

In addition, a passivation layer 24 is deposited on the first substrate 20 upon which the source and drain electrodes 13 and 14 are formed to protect the TFT. Then, a portion of the passivation layer 24 overlying the drain electrode 14 is etched using a photolithographic process to form a contact hole 26 in the passivation layer 24.

In FIG. 3H, a transparent material, such as indium tin oxide (ITO), is deposited onto the passivation layer 24, and patterned using a photolithographic process to form the pixel electrode 16 on the passivation layer 24. Accordingly, the pixel electrode 16 is electrically connected to the drain electrode 14 through the contact hole 26 formed in the passivation layer 24.

In FIG. 3I, a black matrix 32 and a color filter layer 34 are formed on a second substrate 30, the first and second substrates 20 and 30 are bonded together, and a liquid crystal material layer 40 is formed between the bonded first and second substrates 20 and 30.

In the fabrication method of FIGS. 3A to 3I, the source, drain, and pixel electrodes 13, 14, and 16 and/or the semiconductor layer 12 is formed using photolithographic processes that use a photoresist layer. However, use of the photoresist layer in the photolithographic process is problematic. First, the fabrication processes are relatively complex. For example, the photoresist pattern is formed through processes of photoresist coating, baking, exposure, and developing. In addition, in order to bake the photoresist layer, a soft-baking process is performed at a first low temperature and a hard-baking process is performed at a second higher temperature.

Second, a majority of fabrication costs lie with the fabrication of active switching devices. During fabrication of the active switching devices, a plurality of photoresist patterns are required. For example, the cost of forming the photoresist patterns is about 40–45% of the total cost of fabricating the LCD device.

Third, the process for forming the photoresist patterns produces massive amounts of environment pollutants that must be recovered during the fabrication process of the LCD device. In general, the photoresist layer is made by spin coating a photoresist material to achieve a certain thickness. Accordingly, large amounts of the spun-off photoresist material are not used and some amounts are unfortunately released into the environment. In addition, recovery of the spun-off photoresist material increases fabrication costs.

Fourth, since the photoresist layer is applied using the spin coating method, it is difficult to control the thickness of the photoresist layer. Accordingly, thickness of the photoresist layer is non-uniform. Thus, during removal of portions of the non-uniform photoresist layer, residual amounts of the photoresist layer are created that negatively impact operation of the active switching devices.

SUMMARY OF THE INVENTION

Accordingly, the present invention is directed to a liquid crystal display device and method of fabricating a liquid crystal device that substantially obviates one or more of the problems due to limitations and disadvantages of the related art.

An object of the present invention is to provide an LCD device fabricated using a pattern forming method to simplify fabrication processes and reduce fabrication costs.

Another object of the present invention is to provide a method of fabricating an LCD device having simplified fabrication processes and reduced fabrication costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended claims.

To achieve these and other advantages and in accordance with the purpose of the present invention, as embodied and broadly described, a liquid crystal display device includes a plurality of gate lines and data lines on a first substrate defining a plurality of pixel regions, a thin film transistor within the pixel regions, a pixel electrode within the pixel regions, and at least one TiOx layer provided with the thin film transistor.

In another aspect, a liquid crystal display device includes a plurality of gate lines and data lines on a first substrate defining a plurality of pixel regions, a thin film transistor within pixel regions, a pixel electrode within the pixel regions, and a $TiO_2$ layer provided in at least one of the thin film transistor and an upper portion of the pixel electrode.

In another aspect, a liquid crystal display device includes a plurality of gate lines and data lines on a first substrate defining a plurality of pixel regions, a thin film transistor within the pixel regions, a pixel electrode within the pixel regions, and a metal layer provided in the thin film transistor.

In another aspect, a method of fabricating a liquid crystal display device includes forming a gate electrode on a first substrate, forming a TiOx layer on the gate electrode using a Ti masking layer, forming a gate insulating layer on the first substrate, forming a semiconductor layer on the gate insulating layer, forming source and drain electrodes on the semiconductor layer, forming a passivation layer on the first substrate, and forming a pixel electrode on the passivation layer.

In another aspect, a method of fabricating a liquid crystal display device includes forming a gate electrode on a first substrate, forming a $TiO_2$ layer on the gate electrode, forming a gate insulating layer on the first substrate, forming a semiconductor layer on the gate insulating layer, forming source and drain electrodes on the semiconductor layer, forming a passivation layer on the first substrate, and forming a pixel electrode on the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In general, Ti is stable under atmospheric conditions. However, Ti is converted into TiOx when it is heated in an oxygen atmosphere. Accordingly, since Ti and TiOx have different etching selectivity ratios, TiOx may be formed by oxidizing a portion of Ti and an etching solution may be applied to remove the Ti and to form a TiOx pattern. In addition, when light of a certain wavelength is irradiated onto the TiOx, surface properties of the TiOx may become hydrophilic. Accordingly, the TiOx pattern may be formed by making use of differences between hydrophilicity and hydrophobicity. Thus, a metal layer may be precisely etched using the TiOx pattern.

FIGS. 4A to 4F are cross sectional views of an exemplary pattern forming method for fabricating an LCD device according to the present invention. In FIGS. 4A to 4F, a metal pattern may be formed to create an electrode, a semiconductor pattern, and an insulating pattern.

Figure 1:
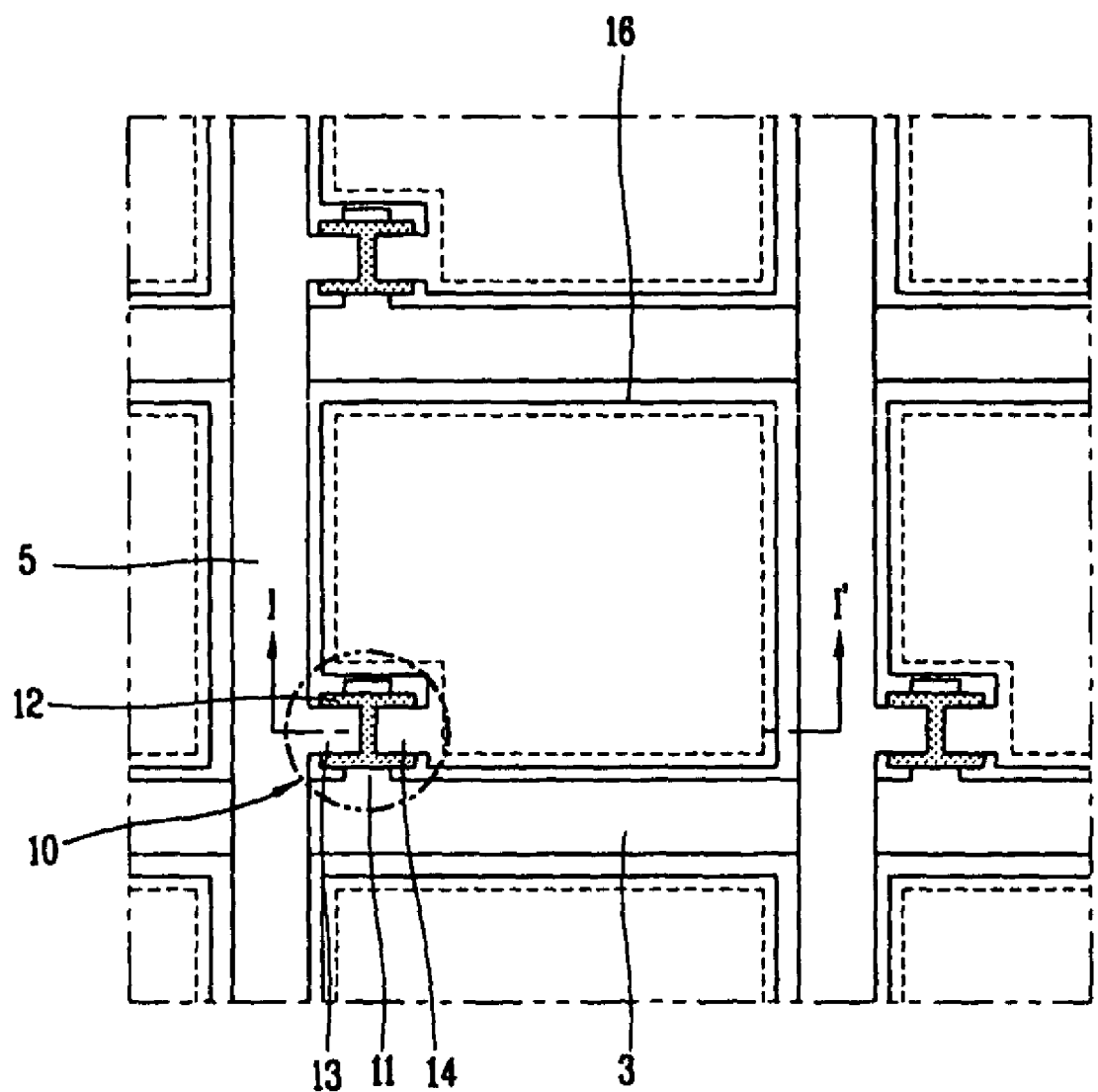
FIG. 1 is a plan view of an LCD device according to the related art.
Figure 2:
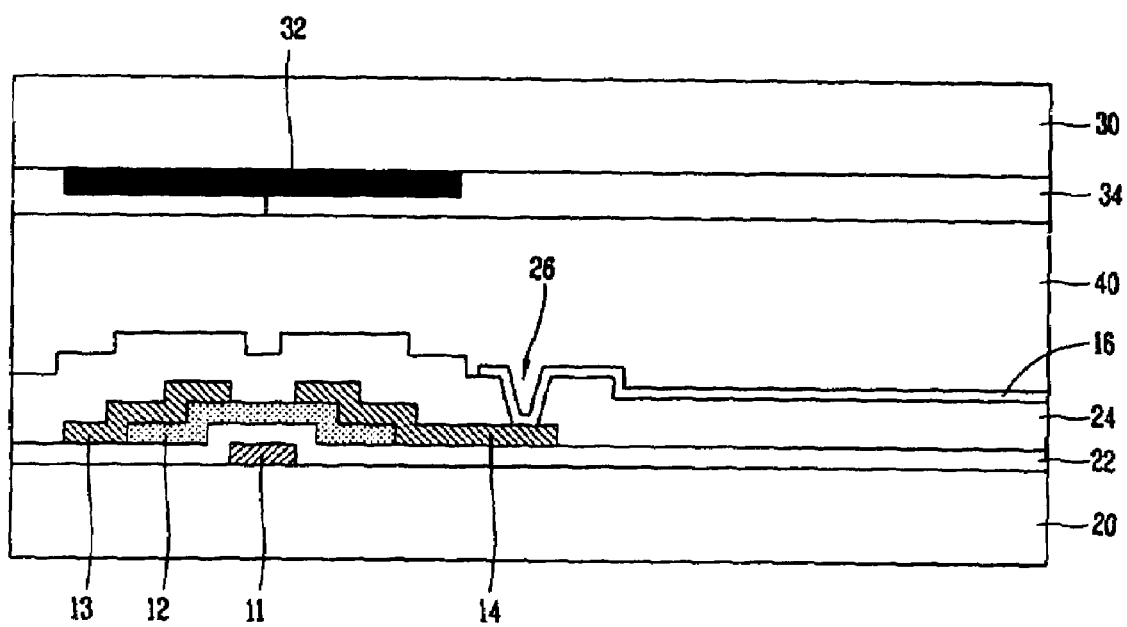
FIG. 2 is a cross sectional view along I–I' of FIG. 1 according to the related art.
Figure 3A:
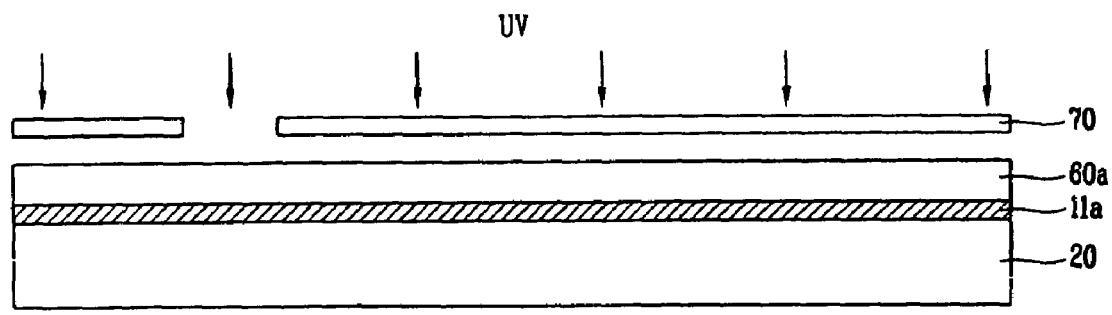
FIGS. 3A to 3I are cross sectional views of a fabrication method of an LCD device according to the related art.
Figure 3B:
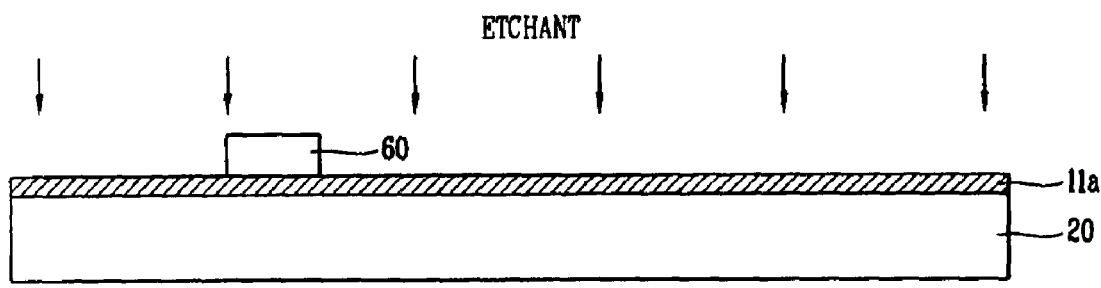
Figure 3C:
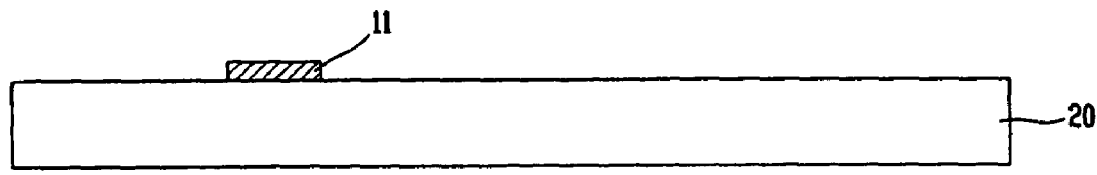
Figure 3D:
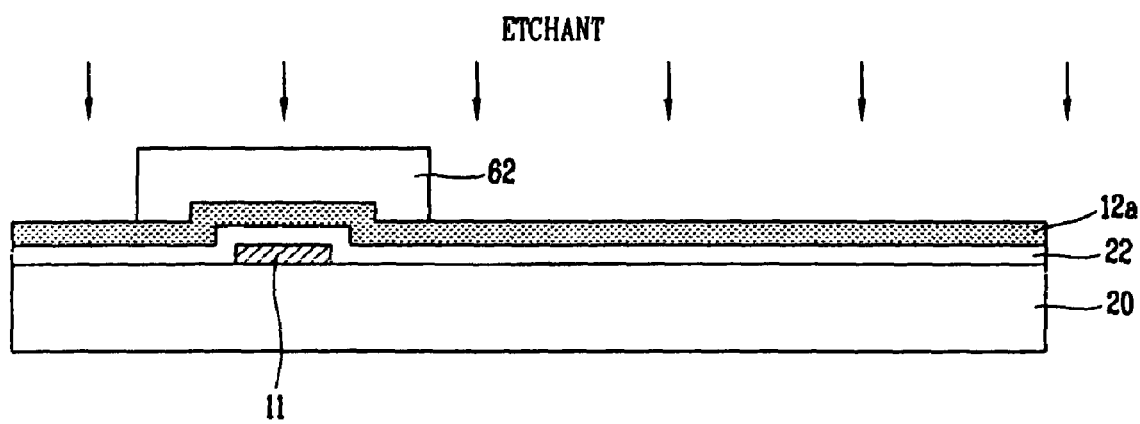
Figure 3E:
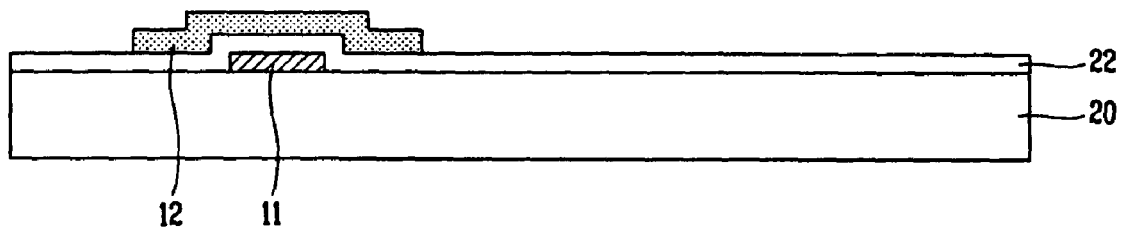
Figure 3F:
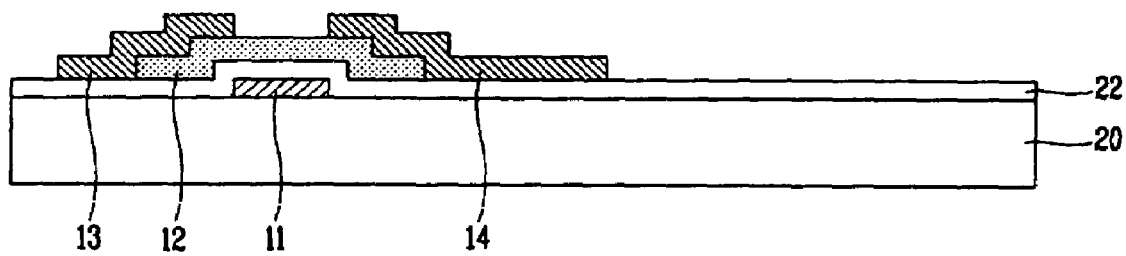
Figure 3G:
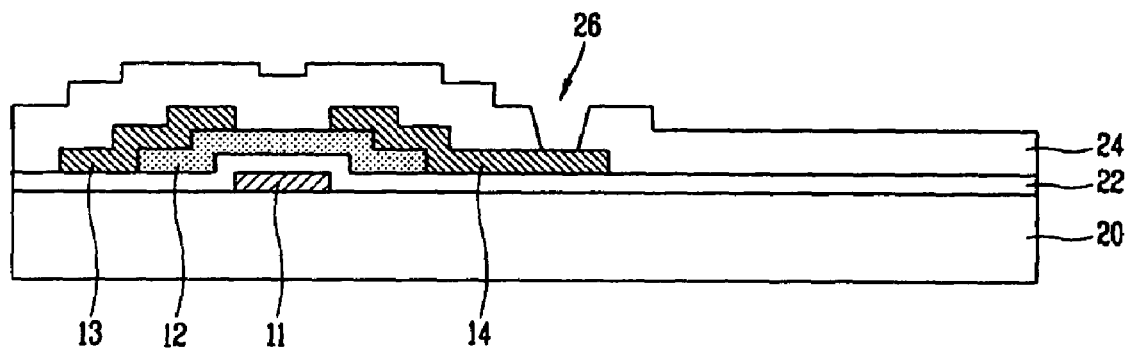
Figure 3H:
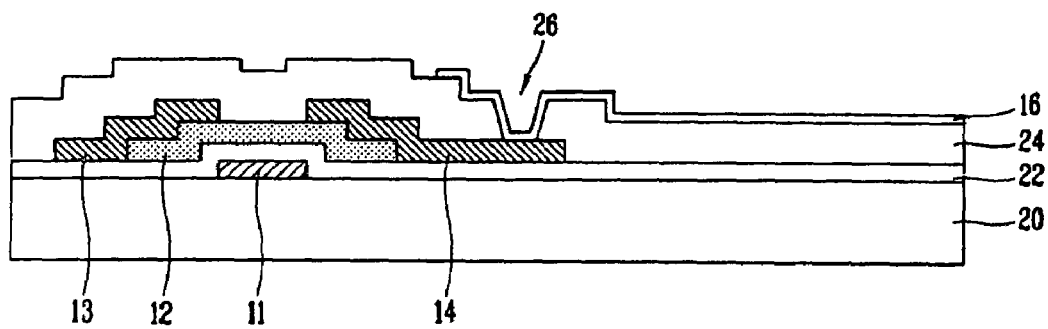
Figure 3I:
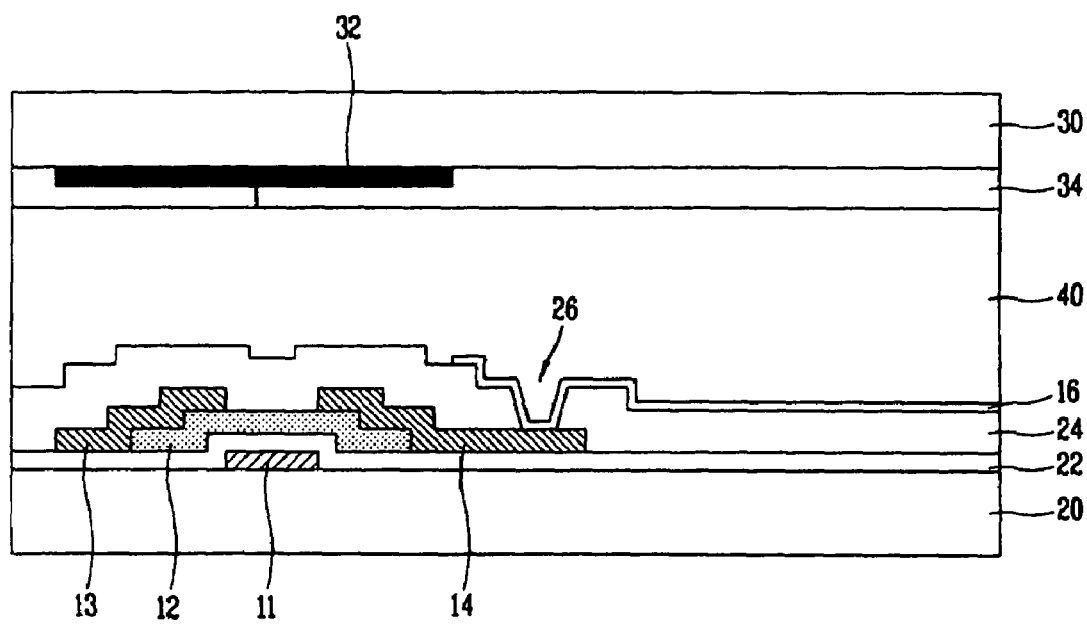
Figure 4A:
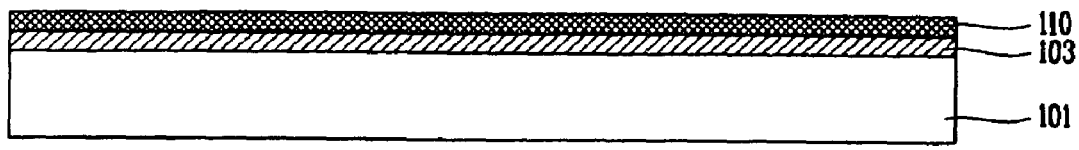
FIGS. 4A to 4F are cross sectional views of an exemplary pattern forming method for fabricating an LCD device according to the present invention.

In FIG. 4A, a metal layer 103 may be formed on an entire surface of a substrate 101 made of insulating material, such as glass or a semiconductor material. Then, a Ti layer 110 may be formed on an entire surface of the substrate 101 to overlie the metal layer 103. The Ti layer 110 may be formed using evaporating or sputtering methods.

Figure 4B:
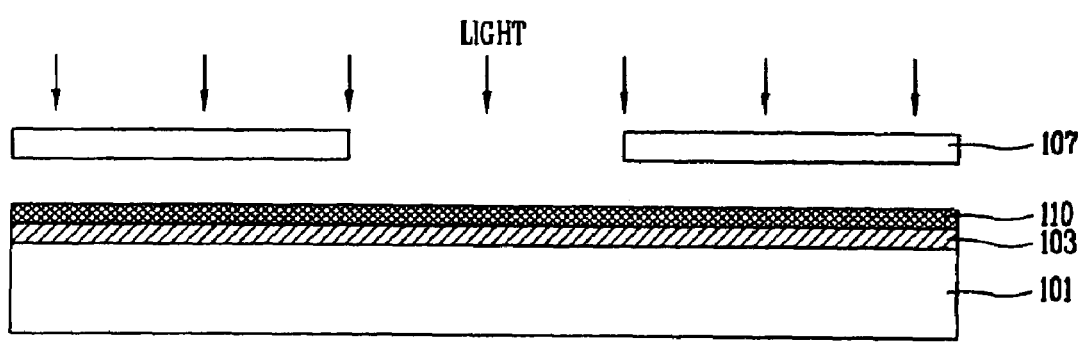

In FIG. 4B, light, such as ultraviolet light or laser produced light, may be irradiated on an area where a metal pattern will be formed using a mask 107. Irradiation of the light results in deposition of energy onto the Ti layer 110.

Figure 4C:
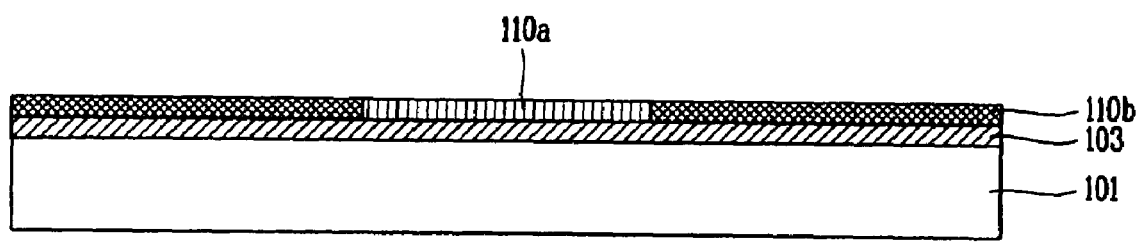

In FIG. 4C, since the irradiation of the light may be performed in an atmospheric or oxidizing atmosphere, portions of the Ti layer 110 exposed to the light may be oxidized. The oxidation of the Ti layer 110 may begin at a surface of the Ti layer 110 and may continue through an entire thickness of the Ti layer 110 over a period of time. Accordingly, the Ti layer 110 may include unexposed portions of the Ti layer 110b an exposed portion of the Ti layer 110a.

Figure 4D:
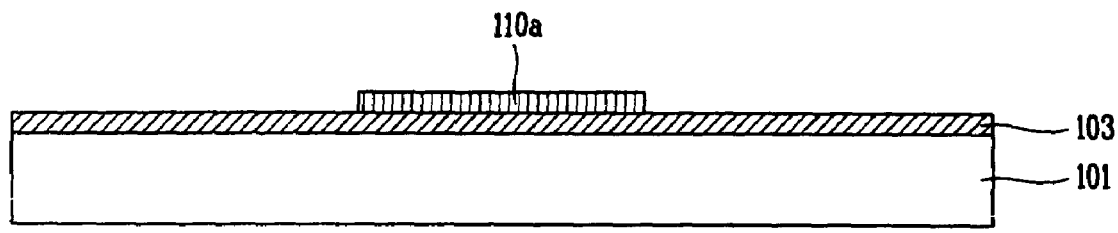
Figure 4E:
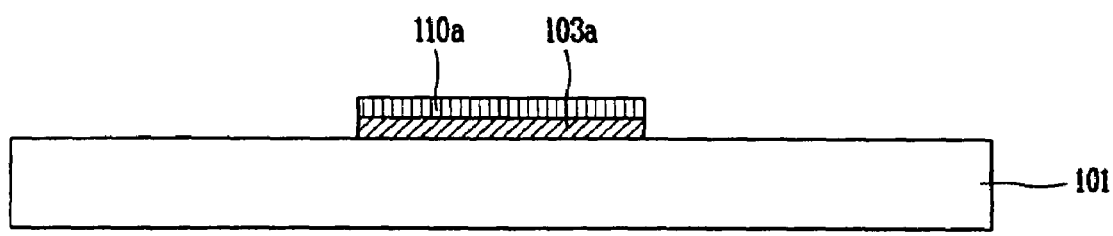

In FIG. 4D, the unexposed portions of the Ti layer 110b may be removed to form a patterned TiOx layer 110a. The unexposed portions of the Ti layer 110b may be removed using wet or dry etching processes. During the wet etching process, acids, such as HF, may be used, wherein the HF acid may not react with the TiOx layer 110a. Accordingly, HF acid etches the Ti layer 110b, and leaves the TiOx pattern 110a on the metal layer 103. In addition, other acids besides HF may be used in order to etch the Ti material. However, it is desirable that $H_2SO_4$ may not be used since $H_2SO_4$ may not react with the Ti material.

During the dry etching process, the etching rate of the TiOx using $Cl_2$ gas or $Cl_2$ mixed gas, such as $CF_4/Cl_2/O_2$ gas, is much lower than the etching rate of the Ti. Accordingly, the $Cl_2$ gas or $Cl_2$ mixed gas may be mainly used as the etching gas.

In FIG. 4D, when the metal layer 103 is etched using the wet etching process or the dry etching process, the TiOx pattern 110a blocks the etching solution (in case of the wet etching process) or the etching gas (in case of the dry etching process). Accordingly, portions of the metal layer 103a underlying the TiOx pattern 110a remain on the substrate 101.

Figure 4F:
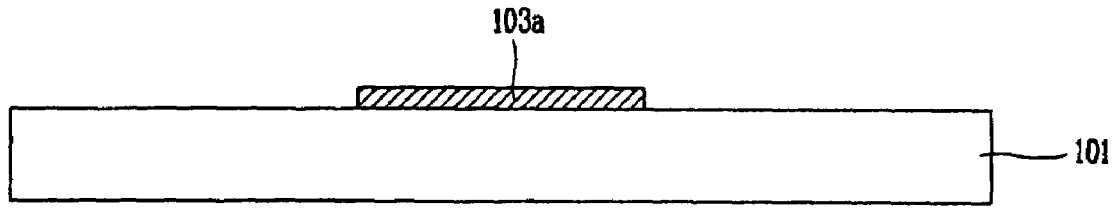

In FIG. 4F, the TiOx pattern 110a on the metal pattern 103a may be etched and removed from the metal pattern 103a. The TiOx pattern 110a may be etched using the wet and dry etching processes. During the wet etching process, $H_2SO_4$ ($SO_4$ ion is reacted with the TiOx and removed) may be used, and during the dry etching process, $Cl_2/N_2$ gas or $CF_4/Cl_2$ gas may be used.

Figure 5A:
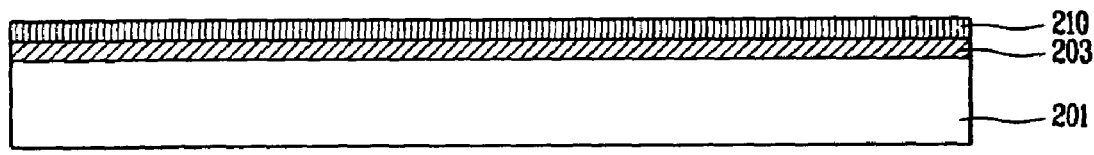
FIGS. 5A to 5F are cross sectional views of another exemplary pattern forming method for fabricating an LCD device according to the present invention.

FIGS. 5A to 5F are cross sectional views of another exemplary pattern forming method for fabricating an LCD device according to the present invention. In FIG. 5A, a metal layer 203 may be formed by depositing metal material(s) on a substrate 201 made of insulating material(s), such as glass or semiconductor material(s). Then, TiOx, especially $TiO_2$, may be deposited to form a $TiO_2$ layer 210 on the metal layer 203. The $TiO_2$ layer 210 may be formed directly onto the metal layer 203 through evaporation or sputtering methods, or may be formed by oxidizing Ti using applications of heat and/or light after depositing the Ti onto the metal layer 203.

Figure 5B:
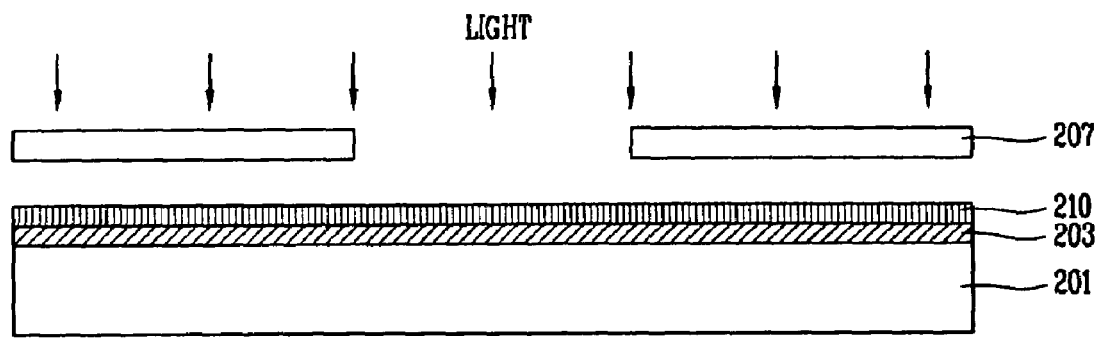

In FIG. 5B, light, such as ultraviolet light or laser light, may be irradiated onto a first area of the $TiO_2$ layer 210 using a mask 207 to form a patterned area. Accordingly, the first area of the $TiO_2$ layer 210 may become hydrophilic. For example, $TiO_2$ material is a photocatalyst material having hydrophobic properties. However, when ultraviolet light or laser light is irradiated onto the $TiO_2$ material, an OH group may be formed on a surface of the $TiO_2$ material, thereby producing a hydrophilic material. A contact angle may be defined as an angle that makes a thermodynamic balance on a surface of a solid and that may be indicative of surface wettability (i.e., hydrophilicity) of a material. Accordingly, when the ultraviolet light is irradiated onto the $TiO_2$ layer 210 for more than a predetermined time, such as one hour, a contact angle may be gradually reduced to near 0 (i.e., hydrophilicity).

Figure 5C:
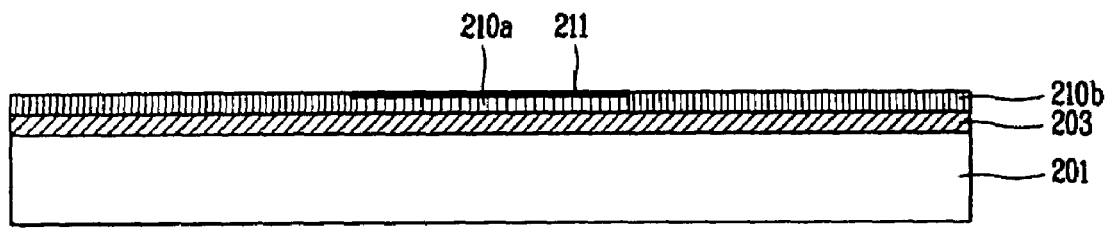
Figure 5D:
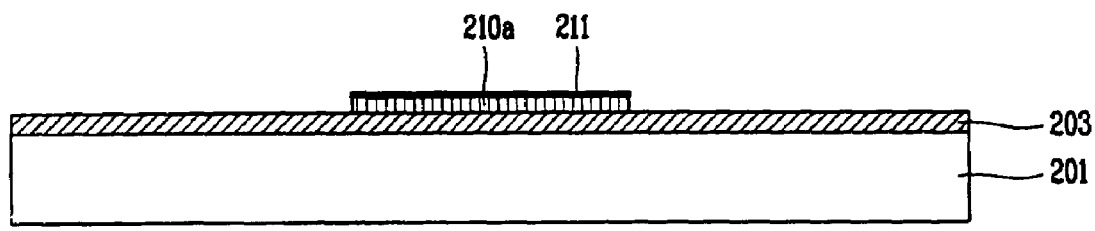

In FIG. 5C, the $TiO_2$ layer may be divided into a first $TiO_2$ layer 210a having a hydrophilic surface 211 and a second $TiO_2$ layer 210b having hydrophobic properties by the irradiation of the ultraviolet light or the laser light. When the $H_2SO_4$ or an etching solution of alkali is applied to $TiO_2$ layers each having different surface properties, the OH group of the first $TiO_2$ layer 210a that has hydrophilic properties may be combined with $SO_4$ ions of the $H_2SO_4$. That is, the surface 211 of the first $TiO_2$ layer 210b may be protected by the OH group. Accordingly, the hydrophobic second $TiO_2$ layer 210b may be removed by the etching solution, and the first $TiO_2$ layer 210a may remain on the metal layer 203, as shown in FIG. 5D.

Figure 5E:
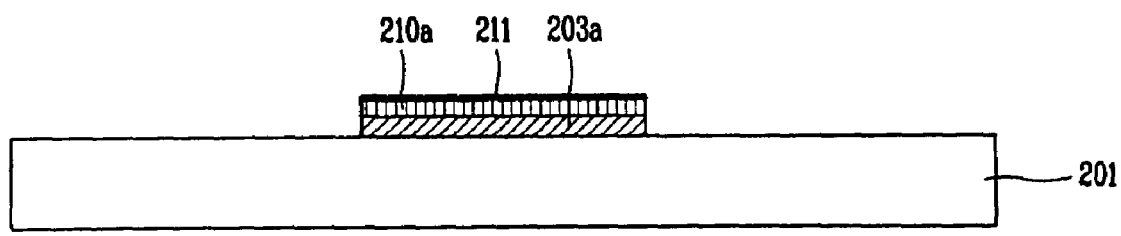

In FIG. 5E, the etching solution may be applied to the metal layer 203. Accordingly, portions of the metal layer 203 may be removed that do not underlie the first $TiO_2$ layer 210a.

Figure 5F:
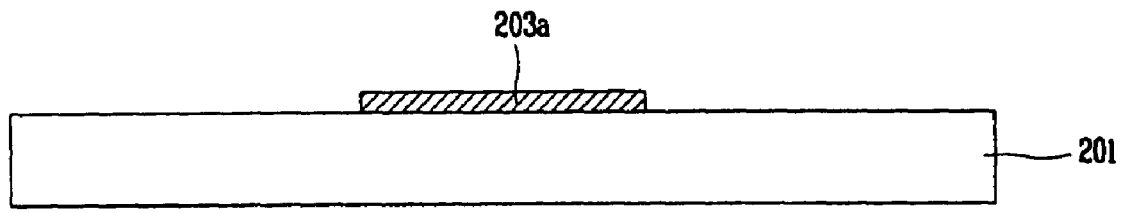

In FIG. 5F, the first $TiO_2$ layer 210a may be removed using a gas, such as $Cl_2/N_2$ or $CF_4/Cl_2$. Accordingly, a metal pattern 203a may be formed on the substrate 201.

Using the pattern forming method according to the present invention, a pattern may be formed by making use of different etching selectivity rates of a first metal, such as Ti, and of a first metal oxide, such as TiOx, and by making use of surface properties of the first metal oxide. The pattern forming method according to the present invention is advantageous as compared to the pattern forming method according to the related art that uses photolithographic processes including photoresist materials.

First, in the pattern forming method according to the related art, baking processes (soft-baking and hard-baking) are required after applying the photoresist, and an ashing process is required when the photoresist is removed. However, according to the present invention, since a photoresist is not required, the fabrication process is simplified.

Second, in the pattern forming method according to the related art, since the photoresist processing and patterning are additional fabrication processes, expensive equipment for the photoresist processing (i.e., a spin coater) is required during each individual process step in addition to equipment for fabricating the active devices (i.e., thin film transistors). On the contrary, the pattern forming process according to the present invention uses metal and metal oxide materials that may be produced using the same equipment used to fabricate the active devices. For example, when the metal pattern is formed, the metal layer and the Ti layer, which are the objects to be etched, may be formed in a vacuum chamber using similar methods (i.e., evaporation or sputtering). Accordingly, no addition equipment, other than those used to fabricate the active devices, is required. Thus, fabrication costs may be greatly reduced as compared to costs associated with the pattern forming method according to the related art that use the photoresist material.

Third, introduction of environment pollutants may be reduced since large amounts of wasted photoresist material are not produced using the pattern forming method according to the present invention. In addition, fabrication costs may be reduced by not producing the large amounts of wasted photoresist material since the pattern forming method according to the present invention uses metal and metal oxide materials.

Figure 6A:
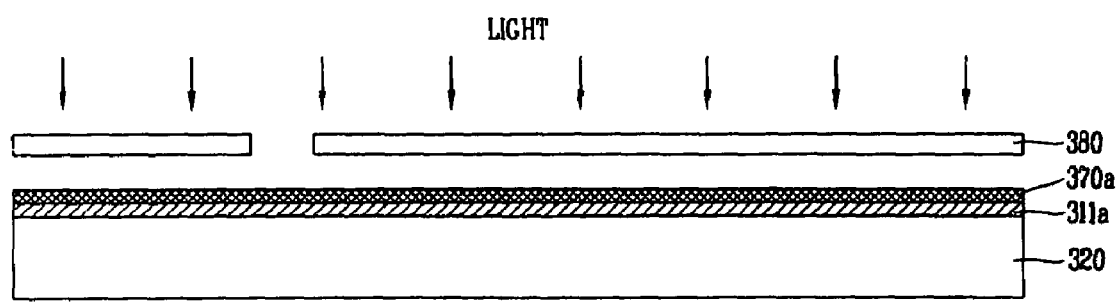
FIGS. 6A to 6G are cross sectional views of an exemplary method of fabricating an LCD device according to the present invention.

FIGS. 6A to 6G are cross sectional views of an exemplary method of fabricating an LCD device according to the present invention. In FIG. 6A, a metal layer 311a may be formed on a first substrate 320 made of a transparent material, such as glass, by depositing a metal, such as Al, an Al alloy, and Cu, and a metal layer 370a, such as Ti, may be formed on the metal layer 311a. Next, light, such as ultraviolet light or laser light, may be radiated onto the Ti layer 370a through a mask 380. Accordingly, portions of the Ti layer 370a exposed to the light may become oxidized and converted into TiOx.

Figure 6B:
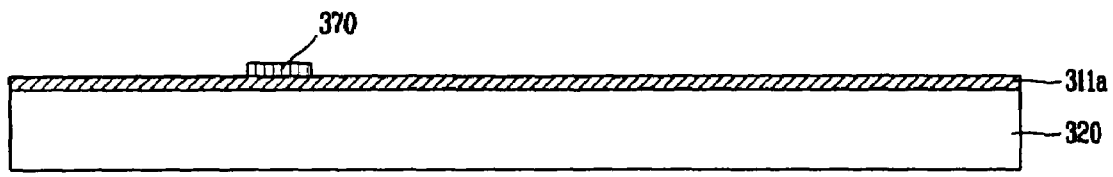

In FIG. 6B, an etching solution (i.e., HF) may be applied, wherein the unexposed portions of the Ti layer 370a may be removed leaving a TiOx pattern 370 on the metal layer 311a. When the etching solution is applied, the portion of metal layer 311a underlying the TiOx pattern 370 remains on the first substrate 320. Accordingly, a gate electrode 311 (in FIG. 6C) and the TiOx pattern are formed on the first substrate 320.

Figure 6C:
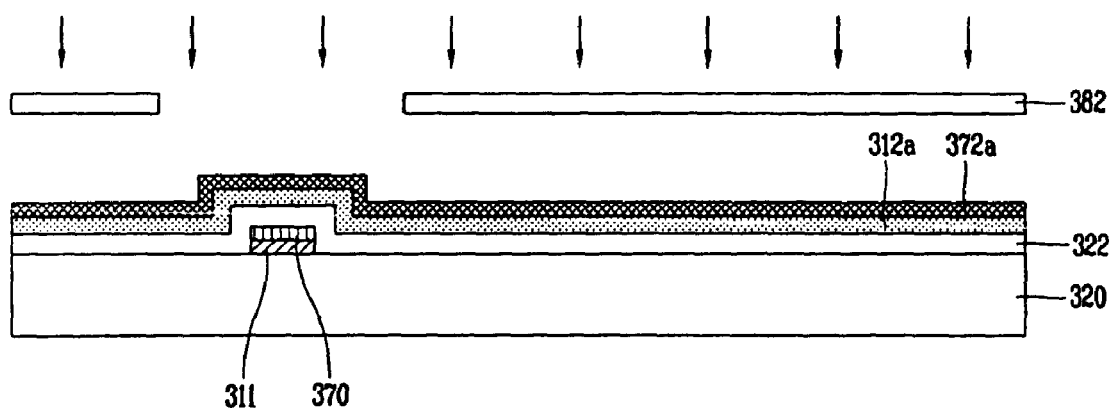

In FIG. 6C, a gate insulating layer 322 may be formed on an entire surface of the first substrate 320 using a chemical vapor deposition (CVD) method, for example, a semiconductor layer 312a may be deposited onto the gate insulating layer 322, and a Ti layer 372a may be formed on the semiconductor layer 312a. Accordingly, when light, such as ultraviolet light or laser light, is radiated onto a portion of the Ti layer 372a using a mask 382, portions of the Ti layer 372a oxidizes to become TiOx.

Figure 6D:
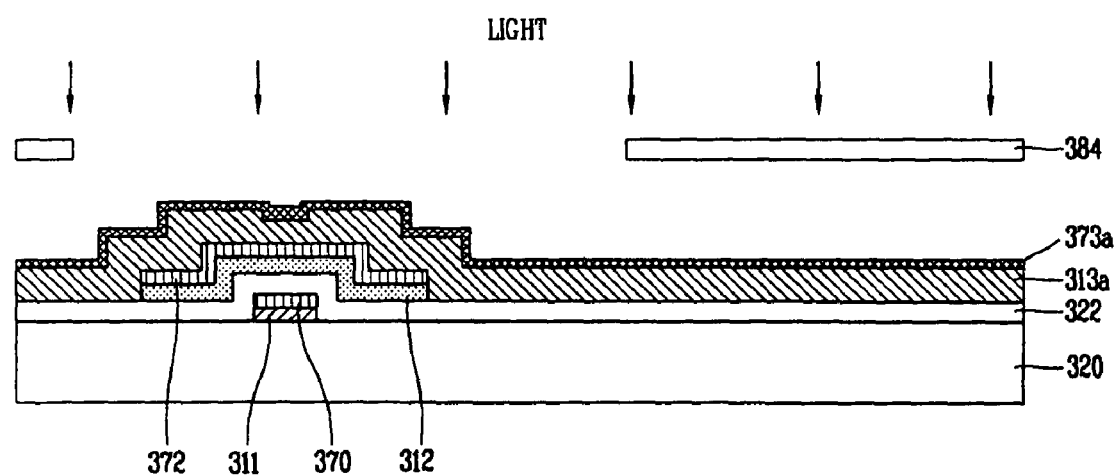

Then, when an etching solution is applied to the Ti layer 372a, the only remaining portion of the Ti layer 372a is the oxidized TiOx portion, thereby forming a TiOx pattern. Next, when the semiconductor layer 312a is etched using etching gas, the portions of the semiconductor layer 312 underlying the TiOx pattern 372 will remain on the gate insulating layer 322, as shown in FIG. 6D. Accordingly, the TiOx pattern 372 may remain on the semiconductor layer 312. Alternatively, the TiOx pattern 372 may be removed form the semiconductor layer 312.

Since the semiconductor layer 312 may include silicon, the TiOx pattern 372 provided on the semiconductor layer 312 may react with the silicon to form Ti-silicide. On the other hand, since the Ti-silicide has a resistance lower than a resistance of the semiconductor layer 312, an ohmic contact may be formed on the semiconductor layer 312 beneath subsequently formed source and drain electrodes 313 and 314 (in FIG. 6E). That is, the converted TiOx pattern 372 provided on the semiconductor layer 312 may remain to function as the ohmic contact layer.

In FIG. 6D, a metal layer 313a, such as Cr, Mo, Al, an Al alloy, and Cu, may be formed on an entire surface of the first substrate 320 upon which the semiconductor layer 312 may be formed, and a Ti layer 373a may be formed on the metal layer 313a. Accordingly, when the metal layer 313a is etched using the mask 384, the source electrode 313 and the drain electrode 314 are formed on the semiconductor layer 312, and TiOx patterns 373 and 374 (in FIG. 6E) may be formed on the source and drain electrodes 313 and 314, respectively. Alternatively, the TiOx patterns 373 and 374 may be removed from the source and drain electrodes 313 and 314, respectively. When the metal layer 313a is etched the TiOx pattern 372 formed on some areas of the semiconductor layer 312 may be removed to form a channel area of the semiconductor layer 312.

Although not shown, the gate electrode 311, the source electrode 313, and the drain electrode 314 may be formed as a plurality of individual layers each comprising a single metal material, or may be formed as a single layer comprising a plurality of different material layers, such as alloys.

Figure 6E:
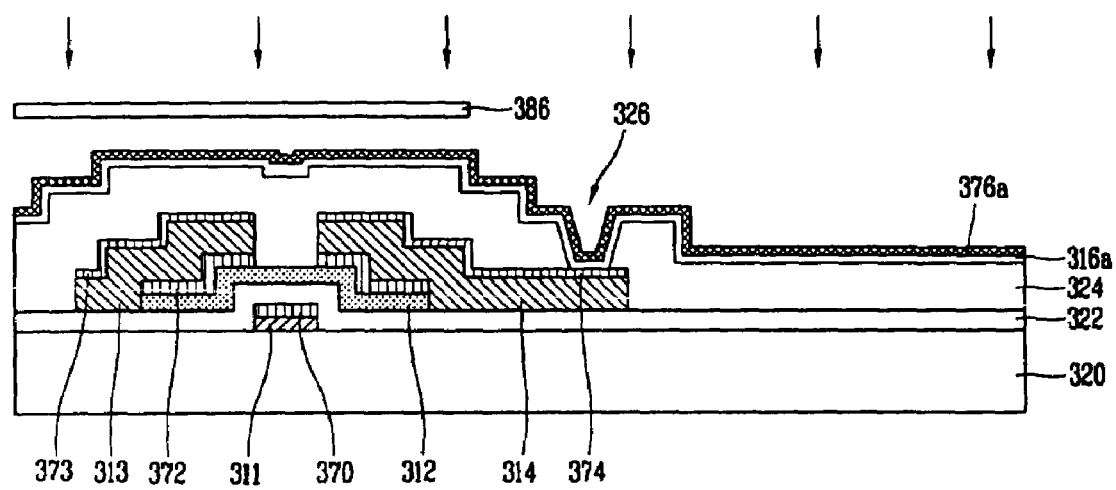
Figure 6F:
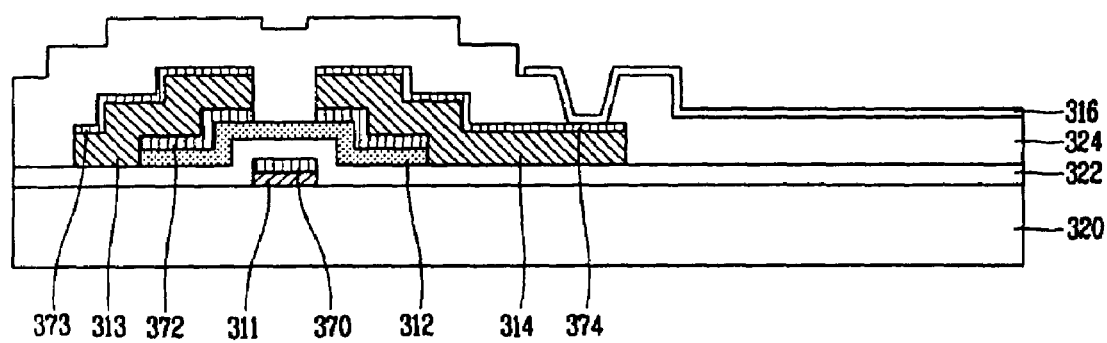

In FIG. 6E, a passivation layer 324 may be deposited on an entire surface of the first substrate 320, and a portion of the passivation layer 324 provided on the drain electrode 314 may be removed to form a contact hole 326. Next, a transparent electrode 316a, such as indium tin oxide (ITO), and a Ti layer 376a may be formed on the passivation layer 324 where the contact hole 326 has been formed, and the transparent electrode 316a may be etched using a mask 386 to form a pixel electrode 316 (in FIG. 6F). In general, since the converted TiOx layer has a low light transmittance, the TiOx layer should not exist within an area where the pixel electrode is formed. Accordingly, the TiOx layer formed on the passivation layer 324 and the pixel electrode 316 may be removed, as shown in FIG. 6F.

Figure 6G:
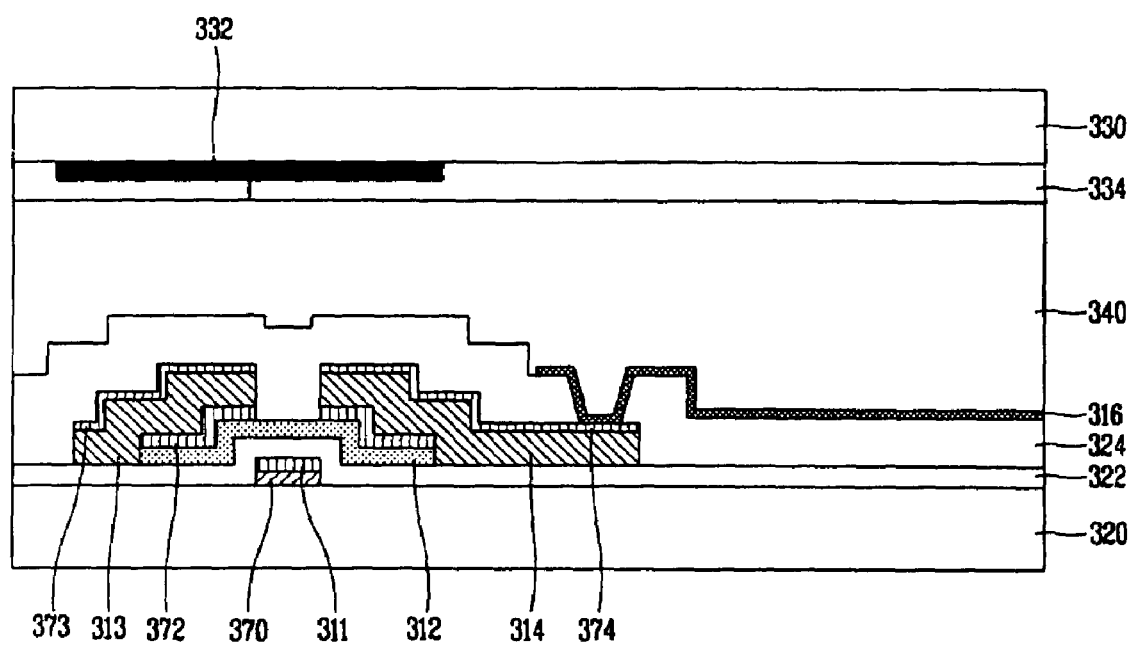

In FIG. 6G, a second substrate 330 may include a black matrix 332 and a color filter layer 334. Accordingly, the first and second substrates 320 and 330 may be bonded together to form an LCD device.

In addition, the present invention may be used together with photolithographic processes using a photoresist layer, as well as a TiOx layer. For example, the TiOx masking layer may be used to form some patterns, and a photoresist layer may be used to form other patterns.

Figure 7A:
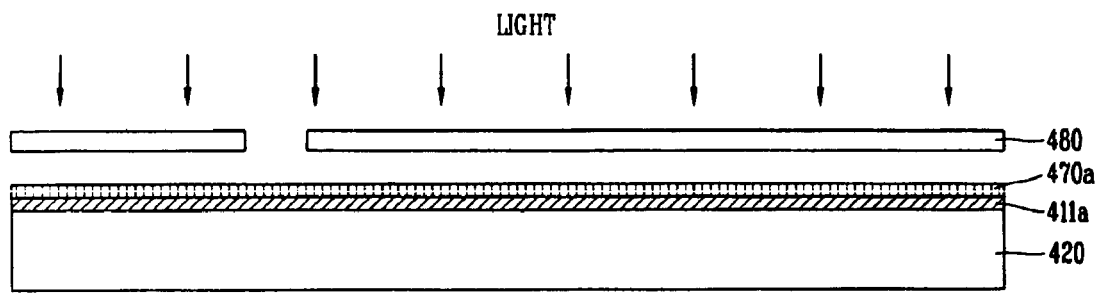
FIGS. 7A to 7F are cross sectional views of another exemplary method of fabricating an LCD device according to the present invention.

FIGS. 7A to 7F are cross sectional views of another exemplary method of fabricating an LCD device according to the present invention. In FIG. 7A, a metal layer 411a may be formed on a first substrate 420 made of transparent material, such as the glass, by depositing metal material(s), such as Al, an Al alloy, and Cu, on the first substrate 420, and a $TiO_2$ layer 470a having hydrophobic properties may be formed on the metal layer 411a. Then, light, such as ultraviolet light or laser light, may be radiated on an upper part of the $TiO_2$ layer 470a using a mask 480. Accordingly, a surface portion 470 (in FIG. 7B) of the $TiO_2$ layer 470a may be converted to have hydrophilic properties.

Figure 7B:
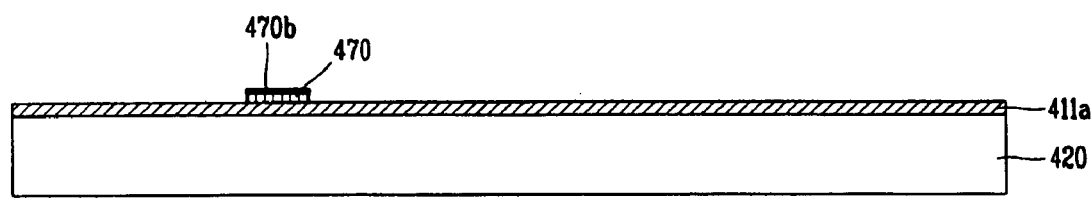

In FIG. 7B, when $H_2SO_4$ or an alkali etching solution is applied to the $TiO_2$ layer 470a (in FIG. 7A), the portion of the $TiO_2$ layer 470a having hydrophobic properties may be removed. Accordingly, the surface portion 470b of the $TiO_2$ pattern 470 may remain on the metal layer 411a.

Figure 7C:
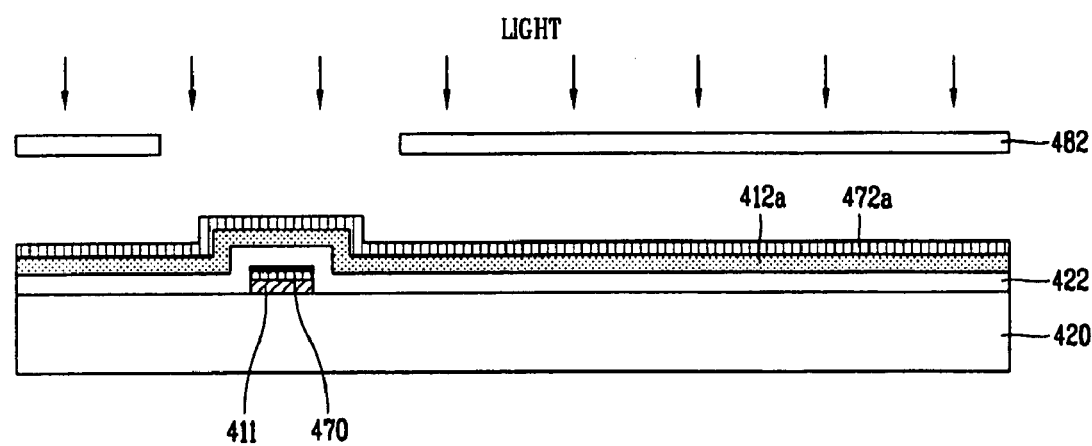

In FIG. 7C, the metal layer 411a may be etched using an etching solution. Accordingly, a portion of the metal layer 411a underlying the $TiO_2$ pattern 470 may remain on the first substrate 420 to form a gate electrode 411. Alternatively, the $TiO_2$ pattern 470 may be removed from the gate electrode 411. Then, a semiconductor layer 412a and a $TiO_2$ layer 472a may be formed on an entire surface of the first substrate 420 upon which the gate electrode 411 may be formed. Next, light may be radiated onto a portion of the $TiO_2$ layer 472a using a mask 482.

Accordingly, the light radiated onto the $TiO_2$ layer 472a may convert a surface of the $TiO_2$ layer 472a into hydrophilic material. Thus, the semiconductor layer 412a may be etched after forming a $TiO_2$ layer 472 (in FIG. 7D) having hydrophilic properties by removing the $TiO_2$ layer 472a having hydrophobic properties similar to the processes for forming the gate electrode 411.

Figure 7D:
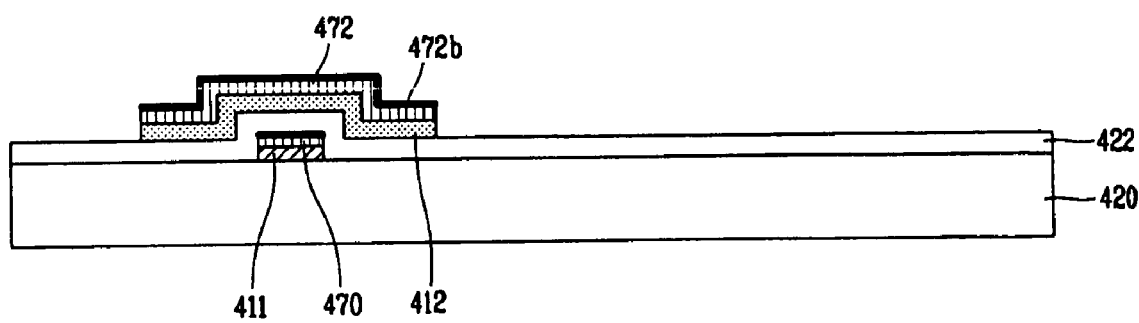

In FIG. 7D, the semiconductor layer 412 may be formed on the gate insulating layer 422. Accordingly, the $TiO_2$ pattern 472 that remains on an upper part of the semiconductor layer 412 may react with the silicon of the semiconductor layer 412 to form Ti-silicide. Thus, an ohmic contact layer 472b may be formed on the semiconductor layer 412.

Figure 7E:
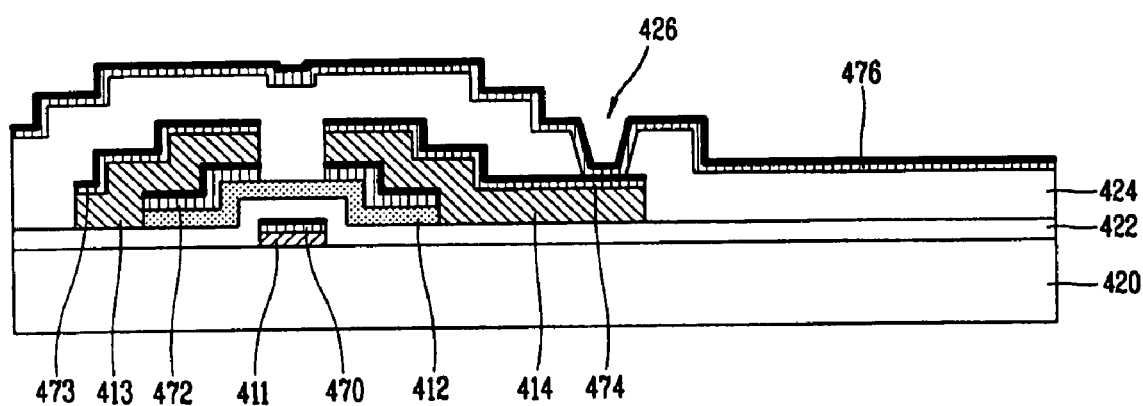

In FIG. 7E, a source electrode 413 and a drain electrode 414 may be formed on the semiconductor layer 412 using processes similar to those shown in FIGS. 7A–7D, wherein TiO$_2$ patterns 473 and 474 may be forming on the source electrode 413 and on the drain electrode 414. Alternatively, the TiO$_2$ patterns 473 and 474 may be removed from the source and drain electrodes 413 and 414. Next, a passivation layer 424 may be deposited on an entire surface of the first substrate 420, and a portion of the passivation layer 424 corresponding to the drain electrode 414 may be etched to form a contact hole 426. In addition, a TiO$_2$ pattern 476 may be formed on the passivation layer 424.

Although not shown, the gate electrode 411, the source electrode 413, and the drain electrode 414 may be formed as a plurality of individual layers made of a single metal material, or may be formed as a plurality of single layers each made of different alloys.

Figure 7F:
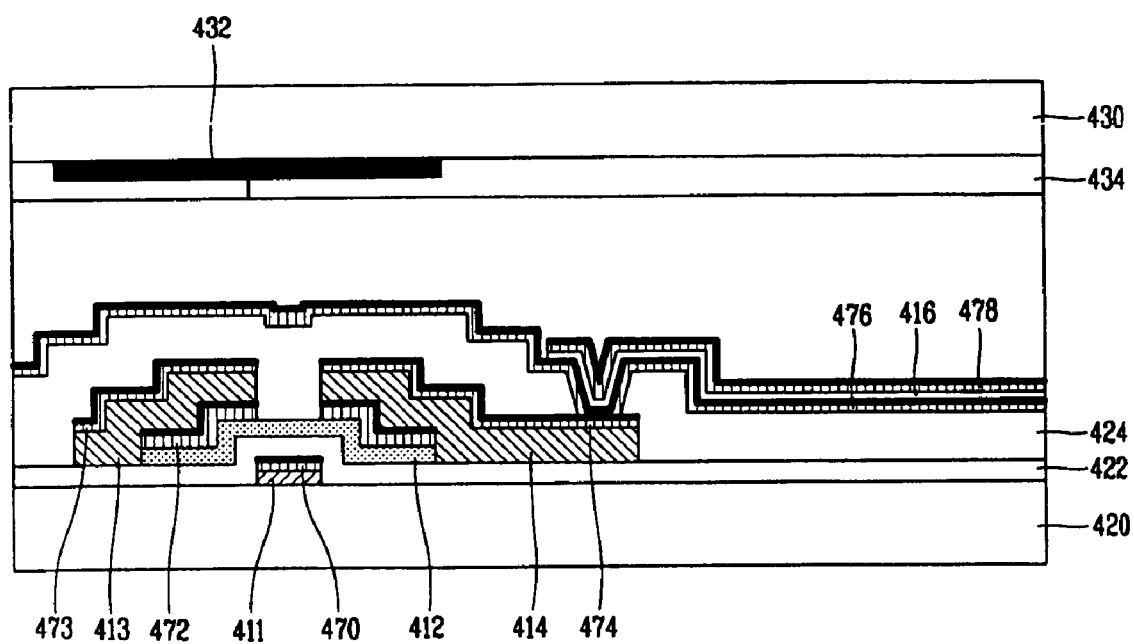

In FIG. 7F, an ITO layer and TiO$_2$ layer may be formed on the passivation layer 424, and the ITO layer may be etched making use the hydrophobic and hydrophilic surface properties of the TiO$_2$ layer to form a pixel electrode 416 and a TiO$_2$ pattern 478 connected to the drain electrode 414 through the contact hole 426.

The TiO$_2$ material has a resistivity of $10^3$ Ωcm and a visible ray transmittance of 85%. Thus, the TiO$_2$ pattern 476 formed on upper part of the passivation layer 424 and the TiO$_2$ pattern 478 formed on an upper part of the pixel electrode 416 may not be removed. Alternatively, the TiO$_2$ patterns 476 and 478 may be removed. Accordingly, adjacent pixel electrodes of neighboring pixel regions are not broken and light transmitted within the pixel regions is not blocked by the TiO$_2$ patterns 476 and 478.

In FIG. 7F, a second substrate 430 may include a black matrix 432 and a color filter layer 434. Then, the first and second substrates 420 and 430 may be bonded together to form the LCD device.

According to the present invention, since the TiO$_2$ layer formed on the semiconductor layer 412 reacts with the semiconductor layer 412, no additional ohmic contact layers, or processes for forming additional ohmic contact layers may be necessary. Moreover, since the TiO$_2$ patterns 476 and 478 are transparent and have a relatively high resistivity, removal of the TiO$_2$ patterns 476 and 478 on the upper part of the passivation layer 424 and the pixel electrode 416 may not be necessary.

In addition, the present invention may be used together with photolithographic processes using a photoresist layer, as well as a TiOx layer. For example, the TiOx masking layer may be used to form some patterns, and a photoresist layer may be used to form other patterns.

It will be apparent to those skilled in the art that various modifications and variations can be made in the liquid crystal display device and method of fabricating the liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    forming a gate electrode on a first substrate using a first hydrophilic TiO$_2$ pattern forming the gate electrode including: forming a metal layer on the first substrate, forming a hydrophobic TiO$_2$ masking layer on the metal layer, the hydrophobic TiO$_2$ masking layer having first and second parts, exposing the first part of the hydrophobic TiO$_2$ masking layer to light to form a hydrophilic TiO$_2$ layer, forming the first hydrophilic TiO$_2$ pattern by etching the second part of the hydrophobic TiO$_2$ masking layer, etching the metal layer using the first hydrophilic TiO$_2$ pattern as a mask to form the gate electrode and the first hydrophilic TiO$_2$ pattern on a surface of the gate electrode;
    forming a gate insulating layer on the first substrate, the first hydrophilic TiO$_2$ pattern disposed between the gate electrode and the gate insulating layer;
    forming a semiconductor layer on the gate insulating layer;
    forming source and drain electrodes on the semiconductor layer;
    forming a passivation layer on the first substrate; and
    forming a pixel electrode on the passivation layer.

2. The method according to claims 1, wherein the light includes one of ultraviolet light and laser light.

3. The method according to claims 1, wherein the second part of the hydrophobic TiO$_2$ layer is etched by an etching solution that includes H$_2$SO$_4$.

4. The method according to claims 1, wherein the second part of the hydrophobic TiO$_2$ layer is etched by an alkali based etching solution.

5. The method according to claim 1, wherein forming the semiconductor layer includes:
    forming the semiconductor layer on the gate insulating layer;
    forming a second hydrophobic TiO$_2$ layer on the semiconductor layer;
    exposing first part of the hydrophobic TiO$_2$ layer on the semiconductor layer to light to form a hydrophilic TiO$_2$ layer on the semiconductor layer;
    forming a second hydrophilic TiO$_2$ pattern by etching unexposed portions of the hydrophobic TiO$_2$ layer on the semiconductor layer to remove the unexposed portions of the hydrophobic TiO$_2$ layer on the semiconductor layer; and
    etching the semiconductor layer using the second hydrophilic TiO$_2$ pattern as a mask.

6. The method according to claim 1, wherein forming the source and drain electrodes includes:
    forming an additional metal layer on the semiconductor layer;
    forming a hydrophobic TiO$_2$ layer on the additional metal layer;
    exposing a first part of the hydrophobic TiO$_2$ layer on the addition metal layer to light to form a hydrophilic TiO$_2$ layer on the on the additional metal layer
    forming a third hydrophilic TiO$_2$ pattern by etching the hydrophobic TiO$_2$ layer on the additional metal to remove a second part of the hydrophobic TiO$_2$ layer on the additional metal layer; and
    etching the additional metal layer using the third hydrophilic TiO$_2$ pattern as a mask.

7. The method according to claim 1, wherein forming the pixel electrode includes:
    forming an indium tin oxide layer on the passivation layer;
    forming a hydrophobic TiO$_2$ layer on the indium tin oxide layer;
    exposing a first part of the hydrophobic TiO$_2$ layer on the indium tin oxide layer to light to form a hydrophilic TiO$_2$ layer on the indium tin oxide layer;

forming a fourth hydrophobic TiO$_2$ pattern by etching the hydrophobic TiO$_2$ layer on the indium tin oxide layer to remove a second part of the hydrophobic TiO$_2$ layer on the indium tin oxide layer; and etching the indium tin oxide layer using the fourth hydrophilic TiO$_2$ pattern as a mask.

8. The method according to claim 1, further comprising forming a contact hole in the passivation layer to interconnect the pixel electrode to the drain electrode.

9. The method according to claim 1, further comprising:

forming a black matrix and a color filter layer on a second substrate;

bonding the first substrate and the second substrate together; and forming a liquid crystal material layer between the first and second substrates.

* * * * *